US 8,527,869 B2

(12) United States Patent
Hosea et al.

(10) Patent No.: US 8,527,869 B2
(45) Date of Patent: Sep. 3, 2013

(54) METHOD AND SYSTEM FOR WEB PAGE PERSONALIZATION

(75) Inventors: Devin F. Hosea, Boston, MA (US); Richard Scott Zimmerman, Belmont, MA (US); Arthur P. Rascon, Lexington, MA (US); Anthony Scott Oddo, Jamaica Plain, MA (US); Nathaniel John Thurston, Somerville, MA (US)

(73) Assignee: Cox Communications, Inc., Atlanta, GA (US)

( * ) Notice: Subject to any disclaimer, the term of this patent is extended or adjusted under 35 U.S.C. 154(b) by 556 days.

(21) Appl. No.: 11/057,759

(22) Filed: Feb. 14, 2005

(65) Prior Publication Data

US 2005/0204276 A1 Sep. 15, 2005

Related U.S. Application Data

(63) Continuation of application No. 09/777,807, filed on Feb. 5, 2001.

(51) Int. Cl.
*G06F 17/24* (2006.01)
*G06F 17/25* (2006.01)

(52) U.S. Cl.
USPC .......................................... 715/234; 707/732

(58) Field of Classification Search
USPC ................. 715/513, 511, 514, 515, 517, 530, 715/234
See application file for complete search history.

(56) References Cited

U.S. PATENT DOCUMENTS 5,347,632 A  9/1994 Filepp et al.
5,446,919 A * 8/1995 Wilkins .......................... 725/35
(Continued)

FOREIGN PATENT DOCUMENTS

WO   WO 00/49801   8/2000

OTHER PUBLICATIONS

Mobasher et al.; "Automatic Personalization Based on Web Usage Mining"; 2000; ACM; pp. 142-151.*

(Continued)

*Primary Examiner* — James Debrow
(74) *Attorney, Agent, or Firm* — Merchant & Gould

(57) ABSTRACT

The invention includes a method and system for personalizing displays of published Web pages provided by Web content providers to meet the interests of Web users accessing the pages, based on profiles of the users. The system preferably provides to the requesting user, through a proxy server, an edited version of the HTML file for the original published Web page that is served by a host Web server. The system uses user profiles that may include demographic and psychographic data to edit the requested Web page. The content of a Web page as published by a host Web server may be coded to correlate components of the Web page with demographic and psychographic data. The user profiles may then be used to filter the content of a coded Web page for delivery to a requesting user. The system may rearrange content on a published Web page so that content determined to be of higher interest to a user is more prominently featured or more easily or quickly accessible. The system may also delete content on a published Web page that is determined to be of low interest to a user. In embodiments of the invention, a single proxy server or proxy server system personalizes Web pages from multiple Web servers, using a single user profile for a user.

19 Claims, 11 Drawing Sheets

(56) References Cited

U.S. PATENT DOCUMENTS

| | | | |
|---|---|---|---|
| 5,572,643 A | 11/1996 | Judson | |
| 5,724,521 A * | 3/1998 | Dedrick | 705/26 |
| 5,740,549 A | 4/1998 | Reilly et al. | |
| 5,754,774 A | 5/1998 | Bittinger et al. | |
| 5,761,662 A | 6/1998 | Dasan | |
| 5,794,210 A | 8/1998 | Goldhaber et al. | |
| 5,812,784 A | 9/1998 | Watson et al. | |
| 5,913,040 A | 6/1999 | Rakavy et al. | |
| 5,946,646 A | 8/1999 | Schena et al. | |
| 5,959,623 A | 9/1999 | Van Hoff et al. | |
| 5,983,227 A | 11/1999 | Nazem et al. | |
| 5,991,735 A * | 11/1999 | Gerace | 705/10 |
| 6,026,368 A | 2/2000 | Brown et al. | |
| 6,026,429 A | 2/2000 | Jones et al. | |
| 6,029,182 A | 2/2000 | Nehab et al. | |
| 6,029,195 A * | 2/2000 | Herz | 725/116 |
| 6,055,542 A | 4/2000 | Nielsen et al. | |
| 6,085,229 A | 7/2000 | Newman et al. | |
| 6,112,192 A | 8/2000 | Capek | |
| 6,128,655 A | 10/2000 | Fields et al. | |
| 6,128,663 A | 10/2000 | Thomas | |
| 6,138,142 A | 10/2000 | Linsk | |
| 6,157,946 A | 12/2000 | Itakura et al. | |
| 6,161,112 A | 12/2000 | Cragun et al. | |
| 6,163,316 A | 12/2000 | Killian | |
| 6,177,931 B1 | 1/2001 | Alexander et al. | |
| 6,185,314 B1 * | 2/2001 | Crabtree et al. | 382/103 |
| 6,209,007 B1 | 3/2001 | Kelley et al. | |
| 6,256,633 B1 | 7/2001 | Dharap | |
| 6,286,043 B1 | 9/2001 | Cuomo et al. | |
| 6,327,628 B1 | 12/2001 | Anuff et al. | |
| 6,330,592 B1 | 12/2001 | Makuch et al. | |
| 6,334,109 B1 * | 12/2001 | Kanevsky et al. | 705/14 |
| 6,345,292 B1 | 2/2002 | Daugherty et al. | |
| 6,356,903 B1 * | 3/2002 | Baxter et al. | 707/10 |
| 6,360,227 B1 | 3/2002 | Aggarwal et al. | |
| 6,401,094 B1 | 6/2002 | Stemp et al. | |
| 6,412,008 B1 * | 6/2002 | Fields et al. | 709/228 |
| 6,424,981 B1 | 7/2002 | Isaac et al. | |
| 6,460,036 B1 | 10/2002 | Herz | |
| 6,498,987 B1 | 12/2002 | Kelly et al. | |
| 6,505,201 B1 | 1/2003 | Haitsuka et al. | |
| 6,564,251 B2 | 5/2003 | Katariya et al. | |
| 6,571,279 B1 * | 5/2003 | Herz et al. | 709/217 |
| 6,615,247 B1 | 9/2003 | Murphy | |
| 6,640,240 B1 * | 10/2003 | Hoffman et al. | 709/203 |
| 6,654,689 B1 | 11/2003 | Kelly et al. | |
| 6,684,217 B1 | 1/2004 | Schneider | |
| 6,734,886 B1 | 5/2004 | Hagan et al. | |
| 6,757,691 B1 * | 6/2004 | Welsh et al. | 707/104.1 |
| 6,766,362 B1 | 7/2004 | Miyasaka et al. | |
| 6,839,680 B1 * | 1/2005 | Liu et al. | 705/10 |
| 7,016,894 B2 * | 3/2006 | Saeki | 707/3 |
| 7,058,395 B2 * | 6/2006 | Dowling et al. | 455/414.2 |
| 7,062,510 B1 * | 6/2006 | Eldering | 707/104.1 |
| 7,065,532 B2 * | 6/2006 | Elder et al. | 707/102 |
| 2002/0045154 A1 * | 4/2002 | Wood et al. | 434/350 |
| 2002/0046099 A1 | 4/2002 | Frengut et al. | |
| 2002/0059094 A1 * | 5/2002 | Hosea et al. | 705/10 |
| 2002/0152237 A1 * | 10/2002 | Cohen et al. | 707/513 |
| 2003/0083932 A1 * | 5/2003 | Wolf et al. | 705/14 |
| 2004/0122646 A1 * | 6/2004 | Colossi et al. | 703/22 |
| 2004/0205593 A1 * | 10/2004 | Kraemer | 715/513 |
| 2005/0283401 A1 * | 12/2005 | Swix et al. | 705/14 |
| 2006/0129906 A1 * | 6/2006 | Wall | 715/500 |
| 2007/0088821 A1 * | 4/2007 | Sankuratripati et al. | 709/224 |

OTHER PUBLICATIONS

VanderMeer et al.,"Enabling Scalable Online Personalization on the Web", 2000, ACM, pp. 185-196.*
Yang et al., "Collaborative Web Caching Based on Proxy Affinities", ACM, 2000, pp. 78-89.*
Rossi et al.,"Designing Personalized Web Applications", ACM 2001, pp. 275-284.*
Hirsh et al.,"Learning to Personalize: Recogniizing patterns of behavior helps systems perdict your next move", ACM, Aug. 2000, pp. 102-106.*
Kannan et al.,"marketing Information on the I-way", ACM, 1998, pp. 35-43.*
Said et al.,"Agent-based Interaction Analysis of Consumer Behavior", ACM, 2002, pp. 184-190.*
Velayathan et al.,"Behavior-Based Web Page Evaluation", ACM, 2007, pp. 841-842.*
Faerman et al.,"Adaptive Performance Prediction for Distributed Data-Intensive Applications", ACM, 1999, pp. 1-15.*
Ying Ho, Shuk, "Personalization and Choice Behavior: The Role of Personality Traits", 2008, ACM, pp. 31-47.*
"Documents Delivered to Your Door" Botspot: Best of the Bots article, Dec. 16, 1997 [retrieved on May 20, 2002]. Retrieved from the Internet< www.botspot.com/est/12-16-97.htm>.
"Lycos Buys WiseWire" Wired News Report, Apr. 30, 1998 [retrieved on May 20, 2002]. Retrieved from the Internet: <www.wired.com/news/business/0,1367,12010,000.html>.

* cited by examiner

PRIOR ART
FIG. 6

Sport Guest - Netscape

File Edit View Go Communicator Help

Back  Forward  Reload  Home  Search  Netscape  Print  Security  Stop

Bookmarks  Location: http://my.yahoo.com/?.pre=4

Boston Globe On  AltaVistaHOME  The New York Ti  Apps Portal   What's Related

Need help signing in?   My Sports Center Headlines Nov 22 1:43pm PT   [Edit] [X]

Customize your My Yahoo Headlines to see only the news of interest to you.

Scoreboard [Edit] [X]   Top Sports Stories from AP   Nov 22 1:35pm PT

TODAY
no games for selected teams
- Defendant Carruth Set Up Shooting
- Sonics Suspend Payton for 1 Game
- Braves Payroll To Be Held Below $90M YESTERDAY
no games for selected teams

Major League Baseball   Nov 22 1:26pm PT
- White Sox sign SS Valentin to three-year contract
- Padres claim Middlebrook off waivers
- Braves president suggests the team can't afford both A-Rod and Hampton

Weather [Edit] [X]   World Soccer   Nov 22 1:09pm PT

Los Angeles, CA  52..64 F
Miami, FL       50.72 F
New York, NY    30.36 F
San Fransico, CA 45.55 F
- Leeds United 0 Real Madrid 2 -latest
- Bayern Munich 1 Olympique Lyon 0 - latest
- Brazil investigators seek source of fake passports

PGA   Nov 22 11:08am PT
- Former Ryder Cup player misses card
- Baddeley has a pro's calm for Australian Open
- Singh looks to return to Masters victory form click on city for extended forecast
or search by zip code or City
[Search]

Healthy Meal [Edit] [X]   Team News   [Edit] [X]

Couscous with Sweet Corn   Chicago Cubs
See Full Recipe
- Sosa says talks ongoing with Cubs
- Cubs trade with Oakland for Matt Stairs
- Cubs acquire OF Stairs from A's for minor leaguer

Health Tips [Edit] [X]   New York Yankees   Nov 22 12:12pm PT

Fitness Tip

Document Done:

60

METHOD AND SYSTEM FOR WEB PAGE PERSONALIZATION

CROSS REFERENCE TO RELEATED APPLICATIONS

This application is a continuation application of U.S. patent application Ser. No. 09/777,0807, filed Feb. 5, 2001, entitled METHOD AND SYSTEM FOR WEB PAGE PERSONALIZATION, which application is hereby incorporated herein by reference in its entirety.

FIELD OF THE INVENTION

The invention relates generally to systems and methods for targeting World Wide Web ("Web") content to interested users and specifically to systems and methods for automatically personalizing delivered Web pages based on the preferences of the users requesting the Web pages.

BACKGROUND OF THE INVENTION

Many Web sites attempt to catalog or provide access to an enormous amount of material, typically presented through Web "pages," in a multiplicity of subject areas or categories. For example, an Internet "portal" or "search engine" Web site, designed to help users find the Web content that is of interest to them, may list or otherwise incorporate millions of Web sites and/or individual Web pages pertaining to thousands of subject areas, such as Arts, Computers, Sports, Entertainment, etc. Also by way of example, a retail Web site or "e-tailer" may offer products in a number of categories, such as Women's Clothing, Men's Clothing, Household Appliances, Lawn and Garden Products, etc. In order to provide access to such large amounts of diverse material, such Web sites typically initially present information on a home page or other high-level pages that lead to a variety of content and subject areas. Because these pages are entry points to a Web site for a diverse, anonymous group of users, these high-level Web pages are typically designed for universal appeal and convenience, with a generic organization. This approach allows users to then select and navigate to Web pages that cover the subject areas or categories of interest to them. These high-level pages typically have a generic design for the further reason that once a Web page is published, i.e., available for Web users to access, the page, including the content and the display format, is typically static (except in many cases for the advertising that displays with the page). Consequently, these pages may be designed to appeal to and suit the needs of the widest, most general group of users possible.

For a particular user to locate material of interest through a high-level Web page, he or she may have to scroll or scan through long lists of links to available material or link through several successive levels of increasing specificity. Users may find sifting through the large amount of available material using these methods to be slow, inefficient and cumbersome. Users may devote a considerable amount of time simply to locating material of interest, and may miss such material altogether due to the prominence or predominance of other material. For example, if material of interest is "below the fold," i.e., requires scrolling after the Web page arrives in order to be visible, or if it is buried in a large amount of irrelevant information, a user may never consider it.

Moreover, the amount of information and content available on the Internet continues to grow at a fast pace. Not only are new Web sites being created every day, but existing Web sites continue to add new pages with new content. Web sites are reformatted and reorganized, so that users cannot rely on finding the same information in the same place twice consistently. The proliferation of Web content makes it increasingly difficult for users to find what they are looking for. For example, Web portals may become less effective as the amount of Web content classified in their taxonomies increases. The same is true for virtually any large Web site.

If a user becomes frustrated with his or her inability to find desired material at a particular Web site, the user is more likely to go to another Web site for that material, and also to prefer that other Web site for future needs. As many users have the same experience with that Web site, they will similarly favor other Web sites. Eventually, the cumulative effect of these defections will be a significant reduction in traffic at the disfavored Web site. This trend will, in turn, reduce the ability of the disfavored Web site to generate sales and/or advertising revenue (the primary means of revenue generation for many non-e-tailing Web sites).

A more effective means of presenting Web content is tailoring Web content delivered to an individual user to meet the needs, preferences and interests of that user. Personalizing Web content delivered to users may generally improve user satisfaction. Typically on a Web-site-by-Web-site basis, some Web sites support personalization of some features of that particular Web site or a portion of that Web site. A user's experience with Web content on a Web page may include at least three components: content, layout, and graphics components. A Web site may allow a user to explicitly specify certain personalization options with respect to these components. A user may, for example, select desired types of content, perhaps by filling out a questionnaire or checklist.

For example, Yahoo!® (home page: www.yahoo.com), a well-known Web portal, includes a section called "My Yahoo!®" that allows a user to personalize some aspects of his or her interface to Yahoo!®. FIG. 1 shows a screen-shot of the Yahoo!® home page 10. FIG. 2 shows a screen-shot of the My Yahoo!® home page 30. My Yahoo!® allows a user to develop a "Front Page" directed to his or her interests. FIG. 3 is a screen-shot of a Web page form 32 that allows a user to personalize the content of his or her Front Page by explicitly selecting desired content modules from a checklist 34. My Yahoo!® also allows a user to tailor the layout and the presentation features such as color and background based on his or her preferences. FIG. 4 is a screen-shot of a Web page 40 that allows a user to select a layout of the selected content modules for the Front Page; FIG. 5 is a screen-shot of a Web page 50 that allows a user to select a particular color scheme for My Yahoo!® pages. FIG. 6 is a screen-shot of a sample Front Page Web page 60 that has been personalized by a sports fan.

This personalization scheme has limited effectiveness. In the My Yahoo!® type of personalization scheme, the user explicitly specifies his or her preferences and, once specified, these recorded preferences typically remain the same unless explicitly updated or changed. These preferences are invoked by entering a user name and password for or at the particular Web site. Moreover, these preferences are generally specific to a local environment; for example, these preferences may be limited to My Yahoo!® and may not carry over to the "public areas" of the Yahoo!® Web site, let alone to other Web sites. Moreover, these preferences are not applicable to published Web content. In order to specify similar preferences on a different or unrelated Web site, the user must re-specify these preferences, if a personalization option is offered at all. Also, these preferences may not necessarily reflect how a user actually uses the Web. A user may select a content module related to Entertainment, but may not otherwise use the Web to access entertainment-related Web sites or purchase tickets. Thus, this type of personalization may not be useful for generalizing to other contexts.

U.S. Pat. No. 6,128,655 to Fields, et al. shows the use of a proxy server that recasts published Web content from multiple Web sites in the look and feel of a hosting site for delivery to a requesting client. Although a user may choose a look and feel format by registering his or her preferences, the Web content is not personalized.

A need exists for a method and system for tailoring published Web page content in real-time, based on the user profiles of the users requesting the Web pages. A need also exists for a method and system for personalizing published Web page content based on user profiles that accurately reflect Web use. A need also exists for a method and system for personalizing published Web page content from a number of Web sites using a single user profile for each user. A need also exists for a method and system that uses a proxy server system for personalizing published Web page content from a number of Web sites based on the user profiles of the users requesting the Web pages.

The present application is related to Utility application Ser. No. 09/558,755 ("the '755 application"), entitled "Method and System for Web User Profiling and Selective Content Delivery," filed Apr. 21, 2000, which has a common assignee with the present application, and which is incorporated herein by this reference. The '755 application discloses, inter alia, a method and system for developing profiles for Web users that may be used in conjunction with the present invention.

SUMMARY OF THE INVENTION

The present invention is directed to providing personalization of Web content in real-time to meet the interests of individual Web users. The invention includes a method and system for personalizing displays of published Web pages provided by Web content providers to meet the interests of Web users accessing the pages, based on profiles of the users. When a published Web page is requested by a user, the system arranges the constituent components of the requested Web page to better suit the interests of that user. In one aspect of the invention, the system rearranges content on a published Web page so that content determined to be of higher interest to a user is more prominently featured or more easily or quickly accessible. In another aspect of the invention, the system edits content on a published Web page so that content determined to be of low interest to a user is eliminated.

The system uses user profiles that may include demographic and psychographic data to edit the requested Web page. The user profiles are preferably based on actual user Web use and surfing activity. Generating the user profiles preferably requires no or limited direct input from the users. The content of a Web page as published by a host Web server may be profiled to correlate components of the Web page with demographic and psychographic data or other data related to the user profiles. The user profiles may then be used to filter the content of the profiled Web pages for delivery to requesting users. A proxy server monitors user requests made through their Web clients, and filters the content of the requested page based on the user profile and the Web page profile, before delivering the page to the user. The system preferably provides to the requesting user, through a proxy server, an edited version of the HTML file for the original published Web page that is served by the host Web server. In embodiments of the invention, a single proxy server or proxy server system personalizes Web pages from multiple Web servers, using a single user profile for an individual user.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

For a fuller understanding of the nature and objects of the present invention, reference should be made to the following detailed description taken in connection with the accompanying drawings, wherein:

FIG. 6 is a screen-shot in a browser window of a sample Yahoo!® "My Front Page" for a sports fan.

DETAILED DESCRIPTION OF THE PREFERRED EMBODIMENTS

Figure 7:
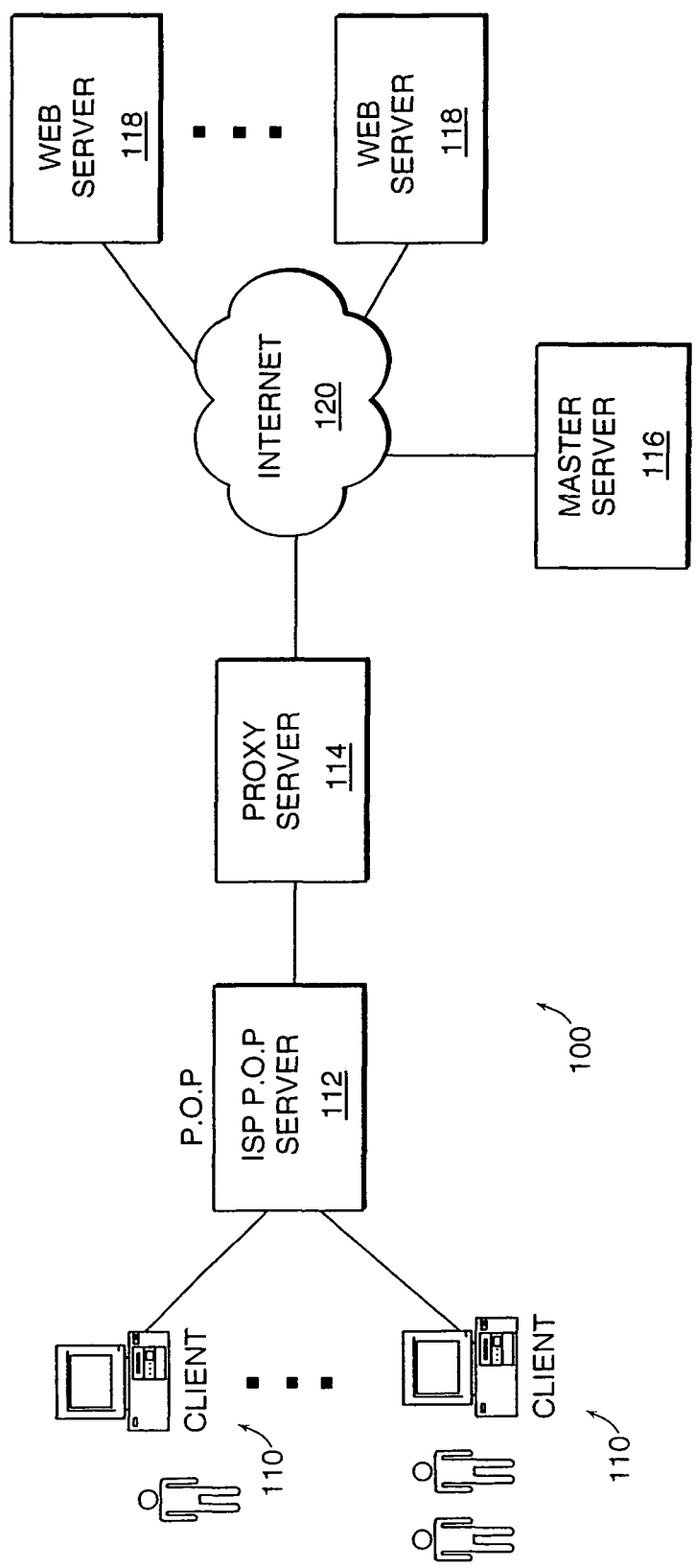
FIG. 7 is a block diagram illustrating a representative network in which the inventive system is preferably implemented.
Figure 8:
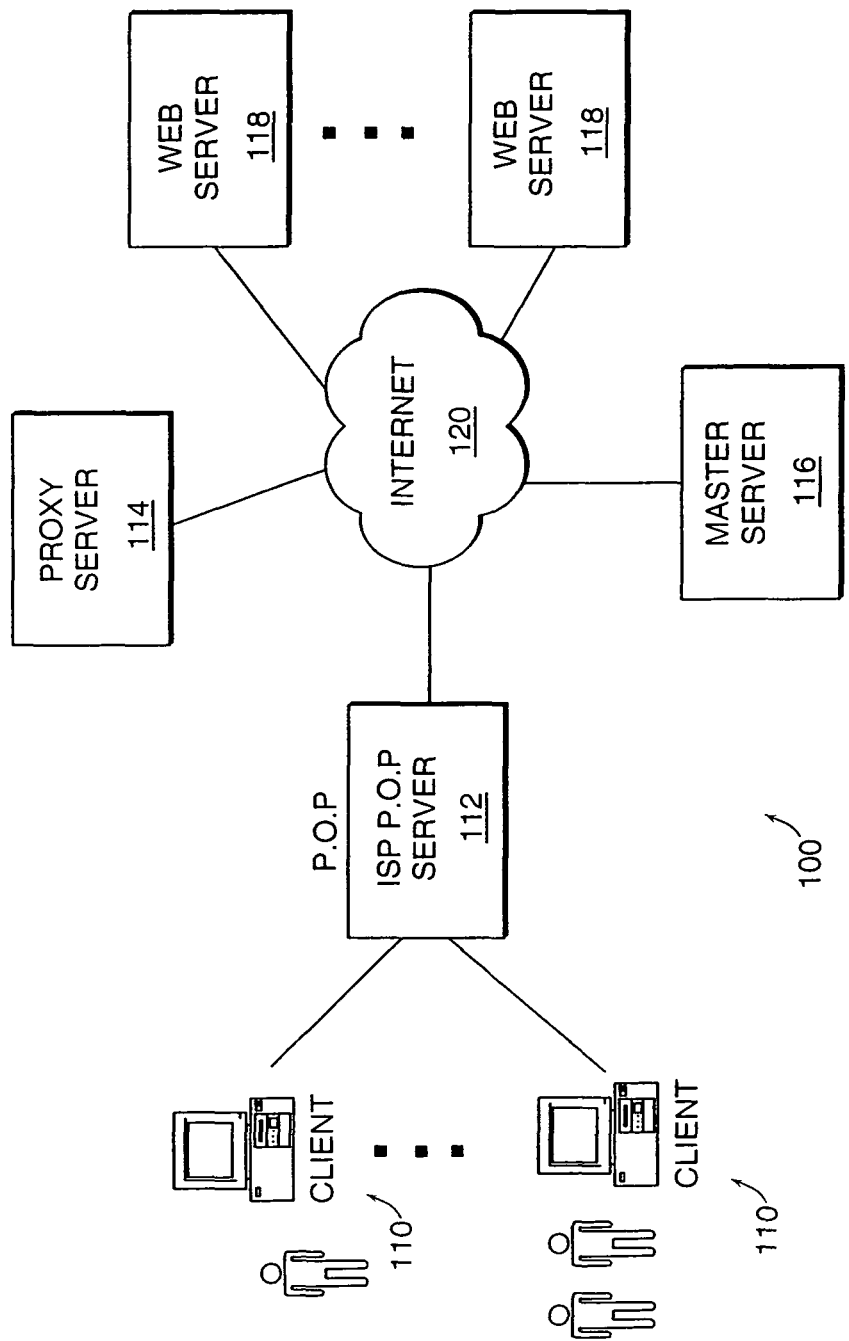
FIG. 8 is a block diagram illustrating an alternative representative network in which the inventive system is preferably implemented.

FIG. 7 illustrates a representative network environment in which the inventive system may be implemented, with a first system architecture. FIG. 8 illustrates an alternative representative network environment in which the inventive system may also be implemented, with an alternative system architecture. Although the inventive system is described herein primarily with reference to the system architecture of FIG. 7, the inventive system may also be implemented in accordance with FIG. 8.

Embodiments of the present invention are directed to providing personalization of Web content in real time to meet the interests of requesting users. The network 100 may provide users with access to remote servers through the medium of the Web. The Web is a multimedia information retrieval system for accessing electronic information, typically via the Internet. In particular, the "Web" may refer to a collection of servers of the Internet that interact using the Hypertext Transfer Protocol (HTTP). The HTTP application protocol provides users access to files on those servers that are defined using, e.g., a standard page description language known as Hypertext Markup Language (HTML). "Web pages" are files defined in the HTML format and can incorporate or link to different file formats such as text, graphics, software, audio, video, etc.

The network 100 includes a plurality of client machines 110 operated by various individual users to access the files over the network 100. A client machine 110 may be operated by one or more users. The client machines connect to multiple servers 118 via communication channel 120, which is preferably the Internet. Communications channel 120 may, however, alternatively comprise an intranet or other known networks or connections. In the case of the Internet, the servers 118 are Web servers that are supported by Web content providers and that are accessible by various clients.

The Web servers 118 operate or host so-called "Web sites" and support HTML files in the form of "Web pages" and documents (including text files, graphics files, software files, video files, audio files, etc.) in various formats linked to the Web pages. HTML provides basic document formatting for the Web pages and allows developers to specify links from the Web pages to other servers 118 and files. These links may be specified as "hyperlinks," which are text phrases or graphic objects that conceal the address of a site on the Web. The main page provided on a Web site typically provides access to various types or classes of information on that Web site, on other Web pages, or possibly on other Web sites, and is referred to as a "home page." A network path to a Web site or a Web page supported by a server 118 is identified by a Uniform Resource Locator (URL).

Users access Web pages of Web sites hosted on the Web servers 118 by specifying the URLs of the desired Web pages at the client computers 110. One example of a client machine 110 is a personal computer such as a Pentium-based desktop or notebook computer running a Windows operating system. A representative computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently, as desired. A client machine 110 may also include, for example, a personal digital assistant, a hand-held wireless telephonic device, or any other network access device.

Client machines 110 are enabled to access servers 118, interact over the Web and display Web content by known software tools called "browsers." Representative browsers include, among others, Netscape® Navigator® and Microsoft® Internet Explorer®. A user of a client machine 110 having an HTML-compatible browser (such as Netscape® Navigator®) can retrieve a Web page (namely, an HTML formatted document) of a Web site by specifying the URL (e.g., www.yahoo.com) in an HTTP request that is sent over the Internet. Upon such specification, the client machine 110 makes a transmission control protocol/Internet protocol (TCP/IP) request to the server 118 identified in the link and receives the Web page in return.

Client machines 110 usually access servers 118 through some private Internet service provider (ISP) such as, e.g., America Online. Illustrated in FIG. 7 is the ISP "point-of-presence" (POP), which includes an ISP POP server 112 linked to the client machines 110 for providing access to the Internet. The POP server 112 is connected to a section of the ISP POP local area network (LAN) that contains the user-to-Internet traffic. As described in the '755 application, the ISP POP server 112 may capture URL page requests from individual client machines 110 for use in user profiling and also distributes retrieved Web pages to users.

As discussed above, the inventive system is a method and system for dynamically personalizing published Web pages available on Web servers on the Internet for delivery to requesting users of the Web. The inventive system tailors the content of published Web pages in accordance with a profile of the requesting user at the time the request is made and delivers a personalized HTML file to the user. Preferably, the inventive system incorporates a proxy server component 114 linked to the ISP POP server 112 that handles the personalization function. In the inventive system, a proxy server 114 fulfills user HRTTP requests with Web pages personalized to the requesting users' profiles, when appropriate. Generally, the proxy server 114 monitors HTTP requests made by users, retrieves the requested Web pages, modifies the Web pages in accordance with a profile of the requesting user, and provides the modified Web pages to the users through the POP server 112. Also, as will also be discussed in detail below, the inventive system may further include a master server 116 linked to the proxy server 114 and the ISP POP server 112 through the Internet 120. The master server 116 handles administration and synchronization functions. The system software is preferably distributed over the network 100 at the ISP POP server 112, the proxy server 114, and the master server 116 as will be discussed below. The network environment may further include, for example, other components and system software for profiling (not shown herein) as discussed in the '755 application.

As shown in FIG. 7, the proxy server 114 is preferably directly linked between the POP server 112 and the Internet 120. In this case, the proxy server 114 functions as a gateway for HTTP requests made by clients 110 of the POP server 112. Alternatively, as shown in FIG. 8, a proxy server 114 may be indirectly linked to the POP server 112 by the Internet. In this case, HTTP requests are transmitted to the proxy server 114 from the POP server 112 via the Internet 120 using standard TCP/IP protocols. A single proxy server may handle HTTP requests from more than one POP server; conversely, multiple proxy servers may handle HTTP requests from a single POP server. Alternatively, the proxy server may be eliminated and its functionality incorporated in each POP server.

Figure 9:
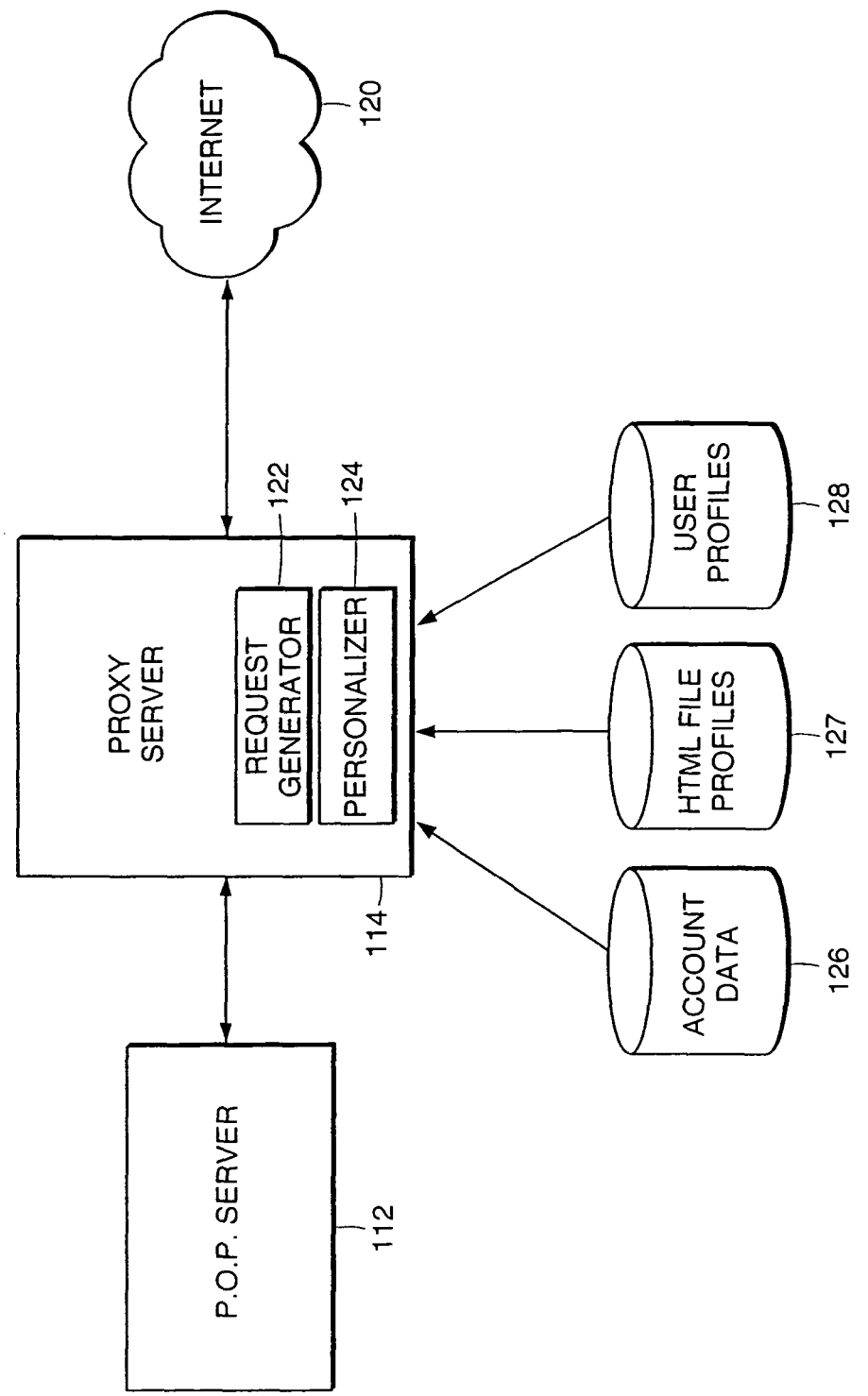
FIG. 9 is a block diagram illustrating the proxy server component of the inventive system.

FIG. 9 further illustrates the proxy server 114 that accomplishes the personalization of delivered Web pages in preferred embodiments of the inventive system. The proxy server 114 may include a request generation component 122 and a Web page personalization component 124. In order to process an HTTP request for delivery of a personalized Web page, the request generation component 122 prepares valid requests for the Web page personalization component 124. For example, the request generation component 122 may initially obtain the request, check that the requested Web page is subject to personalization by the proxy server 114 and associate the request with a user profile. The request generation component 122 may also, for example, retrieve a Web page from a Web server or locate a profile for a Web page.

The request generation component 122 obtains HTTP requests, i.e., URLs, that are outgoing from the clients 110 to the Web servers 118 over the Internet 120. The request generation component 122 may obtain HTTP requests by monitoring all traffic outgoing from the POP server 112 to the Internet 120 with a sniffer to detect outgoing Web page requests. When the sniffer detects an outgoing Web page request from a client 110, it captures the associated packets and extracts the actual URL. User-to-Internet traffic that does not contain an HTTP request passes through the proxy server 114.

Web content providers may request that certain Web pages on their Web servers 118 be personalized or not be personalized in the inventive system, and may specify certain preferences or requirements or other processing instructions regarding the handling of the personalization. For example, Web content providers may prefer that only Web site home pages be personalized, because subsequent link selections by users will inherently ensure that deeper content is of interest to the user. Web content providers may have proxy server accounts that maintain information regarding these issues, stored in account information database 126. In order to process an HTTP request, the request generation component 122 also determines whether the HTTP request is for a Web page subject to personalization, and the corresponding instructions, if any. If the requested Web page is not subject to personalization, the HTTP request may pass through the proxy server 114.

The sniffer of the request generation component also extracts information that may be used to correlate the URL request with a particular user profile. User profiles may typically be stored by reference to anonymous user IDs. So, for example, the sniffer may extract the client's IP address and cross-reference an anonymous user ID table provided by the POP server 112 to obtain the appropriate anonymous user ID for an HTTP request. If multiple users share a single client 110, then each user may be requested to register and to log in at the initiation of a Web session. That log in information may be associated with a user's HTTP request to be further associated with the anonymous user ID that is used to reference the user's profile. Under some circumstances, for example, if the request generation component 122 determines that requesting user does not have an anonymous user ID and/or user profile, the associated HTTP request may pass through the proxy server 114. The user ID information may be stored locally in user profile database 128 or remotely, e.g., at the master server 116 or at the POP server 112. User profile information may be synchronized by the master server 116 periodically, if stored locally.

Alternative to the sniffer in the request generation component 122 of the proxy server 114, the POP server 112 may direct user-to-Internet traffic containing HTTP requests for processing by the proxy server 114 and direct other user-to-Internet traffic to bypass the proxy server 114. The POP server may also associate HTTP requests directed to the proxy server 114 with a user ID so that the proxy server 114 need not determine that information. The proxy server 114 may still confirm that the requested Web page is subject to personalization and obtain any corresponding processing instructions.

The personalization component 124 uses the user profile and a profile of the HTML file to edit the HTML file for the Web page. When the request generation component 122 generates an HTTP request that is eligible for personalization and associated with a user ID, the Web page personalization component 124 accesses the user profile and a profile of the HTML file for the requested Web page, analyzes the data to match the Web page content to user preferences, and produces a modified version of the HTML file for the Web page, personalized in accordance with the user profile. The proxy server 114 preferably obtains the profile from a local user profile database 128. Each user profile may contain, for example, demographic and psychographic data. For example, a user profile may take the following form:

| User ID | Sports | Finance | Movies | Music | TV | ... | Health | Gardening |
|---|---|---|---|---|---|---|---|---|
| 1 | 10.0 (.75) | 21.1 (.62) | 0.0 (1.00) | 9.4 (.84) | 0.0 (1.00) | ... | 50.0 (.77) | 85.0(.82) |

In the illustrated example, each psychographic category in the profile includes an affinity rating, on a scale of 0.0 to 100.0, followed by a confidence measure for that affinity rating. Each user profile is preferably generated by tracking the user's actual Web surfing activity and analyzing the user's click-stream data, as described in the '755 application.

A profile includes classifications for the content components of the HTML file for the requested Web page. The profile of the HTML file for the requested Web page is based on the same or a similar content classification scheme to the user profiles. An HTML file is formed of constituent components that include content components and formatting components, i.e., the HTML "mark-up." The content components include but are not limited to text, images, advertisements and links to other Web pages. By way of example, a content component can comprise the hyperlinked subject heading "Arts & Humanities" 21. The profile of the HTML file for the requested Web page preferably includes a content classification or affinity rating for each content component on the Web page that is subject to personalization. An HTML file profiler parses each HTML file to extract the constituent components, and analyzes and assigns ratings to the content components.

Content components may be associated with demographic and psychographic categories or assigned affinity ratings for a range of categories. Each content component may be evaluated, e.g., by matching keywords in text content components to content affinities or by translating URLs in Web page link content components to content affinities through a categorized URL database. Classification information, such as a categorized URL database, may be provided by entities such as Nielsen. Web content provider processing instructions may also be applied to or incorporated in the profile. Web content providers may also specify certain content affinities for content components of a page. Some content components on a Web page may not be subject to personalization, particularly if the Web content provider has specified that particular components should remain as is in the Web page delivered to the client; these components may be protected in the profile. Certain content components may also be tied together such that if one is profiled, the other is profiled accordingly. Any other instructions from the Web content provider may also be tied into the profile.

After receiving a personalization request from the request generation component 122, the Web page personalization component 124 preferably obtains the associated user profile, HTML file and HTML file profile. The HTML file profiler may be located at the proxy server 114, or may be remotely located, for example, at master server 116. An HTML file may be obtained and profiled in advance, and the original file and the profile may be cached for access by the proxy server in an HTML file profile database 127, or may be dynamically profiled at the time an HTTP request for that HTML file is received from the client. Profiles may be generated by a combination of automated and manual profiling (e.g., by specific instructions supplied by the Web content provider). It is contemplated that an HTML file and its profile may be merged into one combined profiled version of the HTML file rather than maintained as two separate files. If the HTML file is not cached in advance, the proxy server 114 requests the Web page, obtains the HTML file and obtains the profile. If the HTML file is cached for use by the proxy server 114, the proxy server 114 preferably confirms that the cached file (and associated profile) is up-to-date and also transmits the HTTP request to the Web server 118 that originally served the page or maintains a record of the HTTP request so that the Web content provider can accurately register the number of hits to the page.

To personalize a requested Web page, the Web page personalization component 124 analyzes the respective user profile and HTML file profile to determine the most effective organization for the content of the requested Web page for display to that particular user. The proxy server 114 preferably accesses the profiled version of the HTML file from the HTML file profile database 127. In accordance with the inventive system, the content of the Web page may be reorganized in several ways to produce a modified, personalized Web page. Certain content components, if deemed to be of low interest to the user, may be eliminated from the Web page display altogether. Generally, it is preferred to preserve access to all of the content of the original Web page. A link to "Other" content or a link to the original Web page may be provided and a message that the Web page has been personalized may be included in the modified HTML file to ensure that the user is able to access all of the content, if desired. Other content components may be rearranged to position content for which the user has a higher affinity so that it is more easily viewed, for example, by moving it to the top of a list, moving it "above the fold," or setting it apart so that it has more white space around it. Additional content may also be inserted if desired. For example, certain advertisements or links to articles may be included or excluded. Other advertisements or links to articles may be moved to better target the user's preferences. Content may also be modified so that the font or color or other graphics properties are changed.

The Web page personalization component 124 uses the classification of each content component from the profile to analyze its relevance to the requesting user. Content components may be matched to user profiles in any number of ways, for example, by using a certain threshold for the content affinity rating for a user to trigger content components corresponding to that content category. The proxy server 114 provides a modified Web page for display by creating a modified HTML file, with the included content components marked up with HTML code to specify the desired Web page display format.

Although a user profile database derived from clickstream data is preferably the main source for profile information, other sources of profile information may also be employed. For example, geographic information may readily be inferred from a user's IP address, which is transmitted with every URL request. An ISP may also supply user ZIP codes, which provide an alternative means to geographically profile a user. Geographic data could also be included in a stored user profile as described above. Geographic data may be used to deliver personalized content particular to a geographic area, such as local news and weather.

Figure 1:
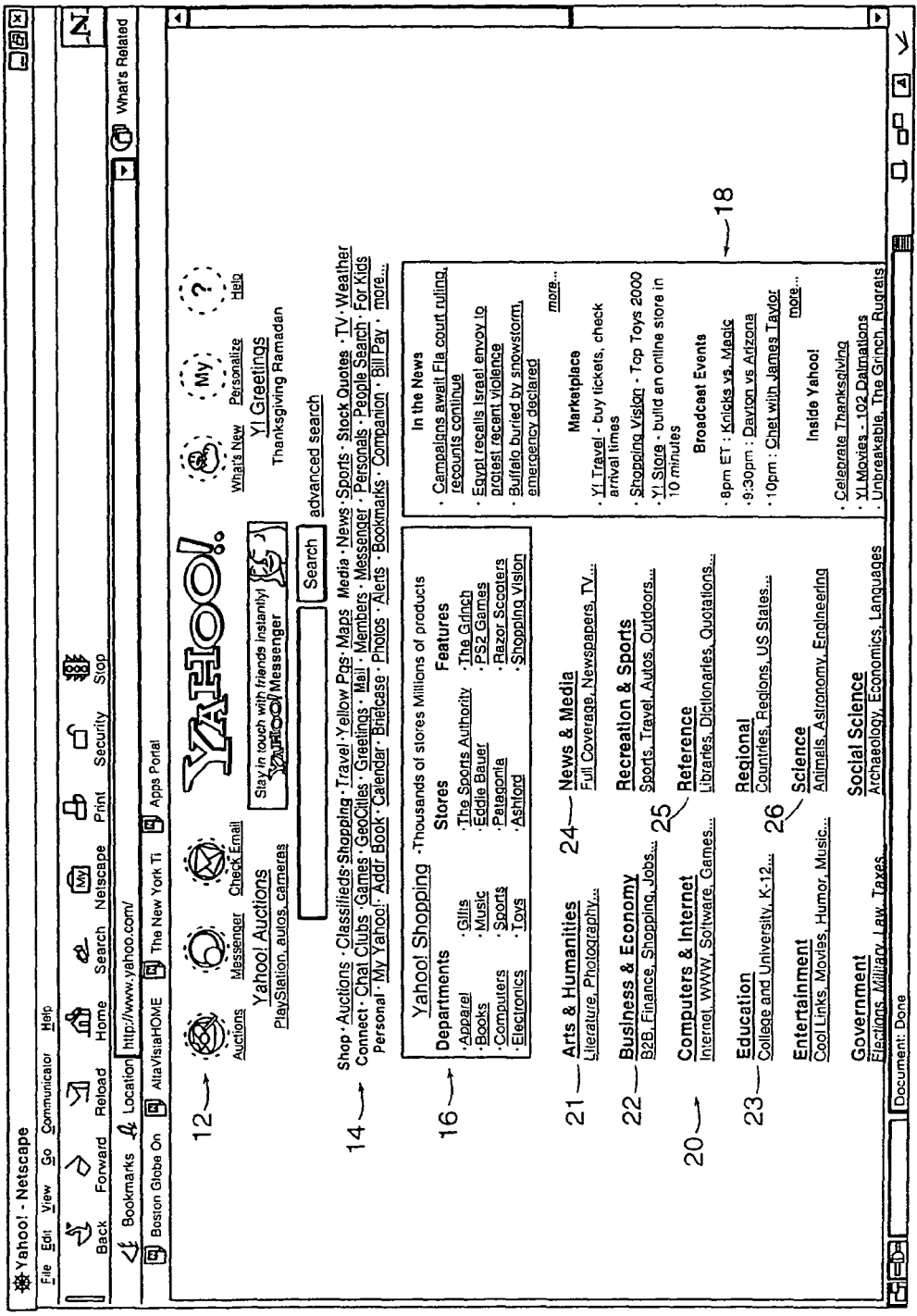
FIG. 1 is a screen-shot in a browser window of a representative Web page, a home page provided by Yahoo!®, a typical Web content provider.
Figure 2:
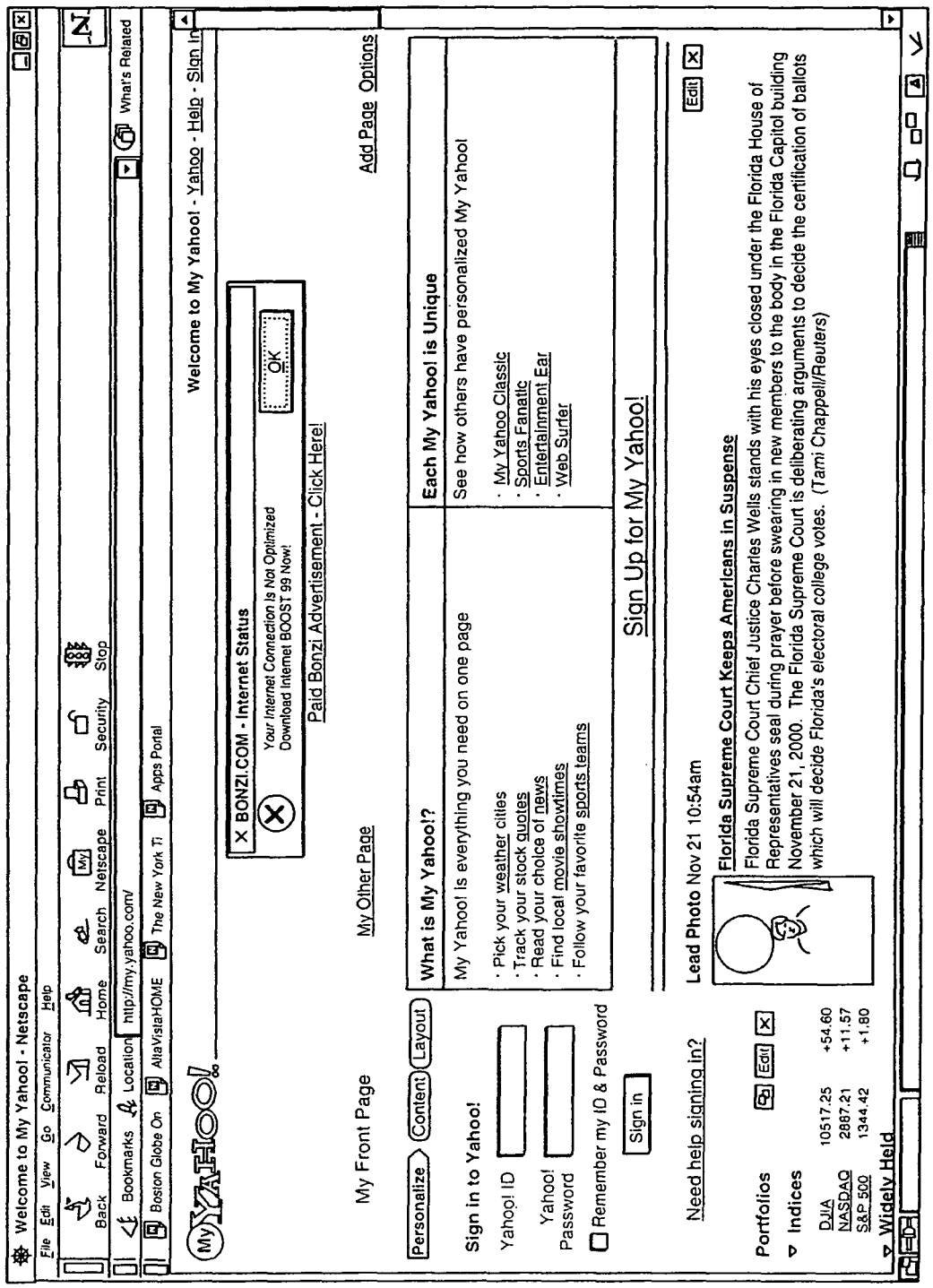
FIG. 2 is a screen-shot in a browser window of a Yahoo!® Web page that allows users to access a Web-site specific, explicit personalization feature.
Figure 10:
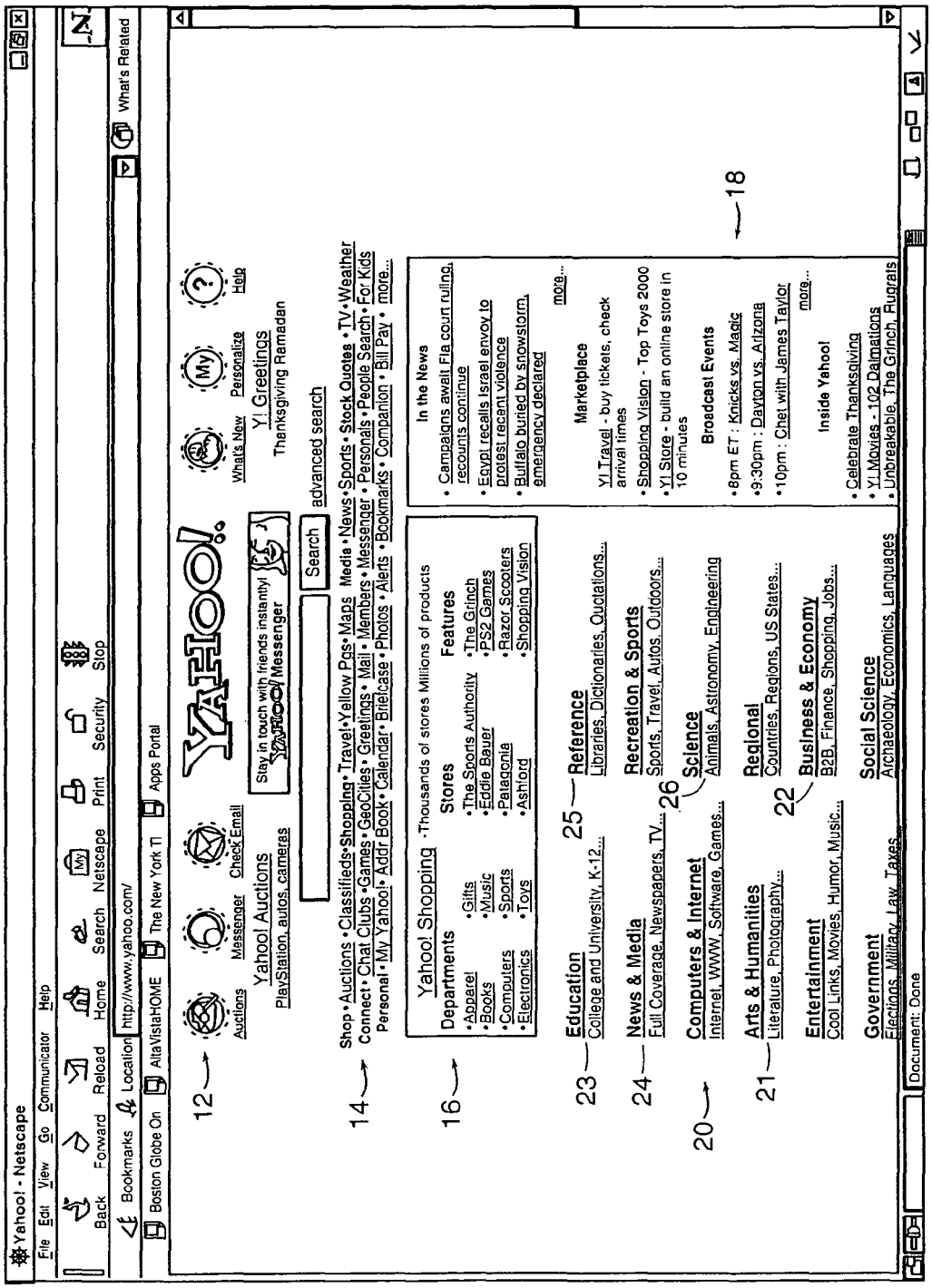
FIG. 10 is a screen-shot in a browser window of a representative Web page that has been personalized in accordance with one aspect of the inventive system.

This modified HTML file is then forwarded to the client 110 through the POP server 112 for viewing by the user. When the revamped file is received at the client 110, the client browser interprets the HTML in the received HTML file and displays the Web page for the user, just as it would have the original Web page from the original, published HTML file. A screen-shot of an exemplary personalized Web page 130 is shown in FIG. 10. The Yahoo!® home page 10 shown in FIG. 1 has been rearranged to better meet the interests of a hypothetical user. The header 12, quick access index 14, quick shopping index 16 and news sidebar 18 have not been modified, for example, in accordance with Web content provider processing instructions with respect to certain constituent components of a Web page. However, the taxonomy-based directory 20 has been rearranged to put subject areas expected to be of greater interest to the user at the top of the list. For example, "Education" 23, "Reference" 25 and "Science" 26 have been moved up; and, "News & Media" 24, "Arts & Humanities" 21, and "Business & Economy" 22 have been moved down.

Figure 11:
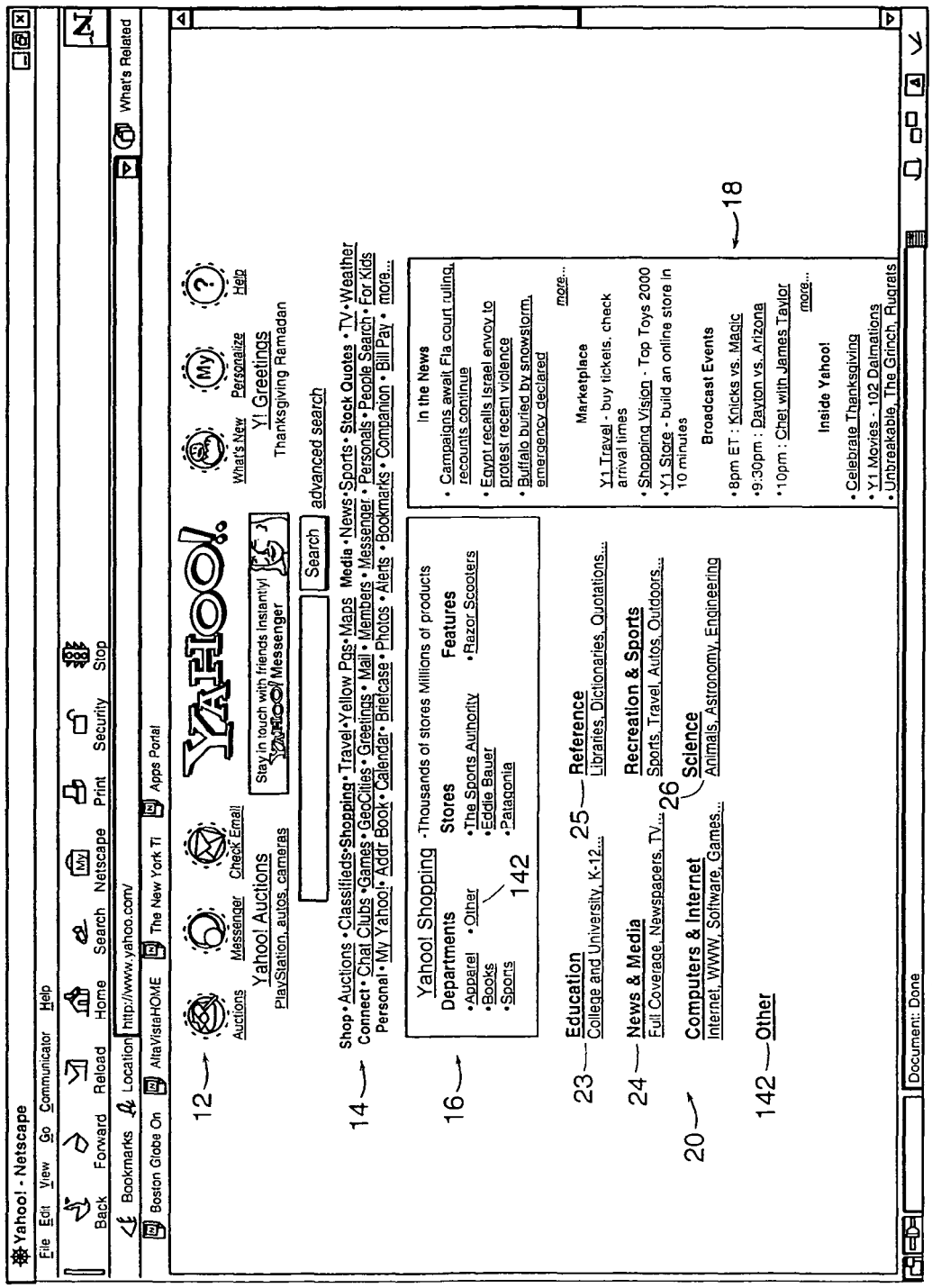
FIG. 11 is a screen-shot in a browser window of a representative Web page that has been personalized in accordance with a second aspect of the inventive system.

A screen-shot of a second exemplary personalized Web page 140 based on the same Yahoo!® home page 10 is shown in FIG. 11. In personalized Web page 140, content not of interest to the user has been eliminated and the remaining content of interest to the user has been rearranged. Again, header 12, quick index 14, and news sidebar 18 have not been edited. However, shopping quick index 16 has been edited to eliminate Departments, Stores, and Features that are not of interest to the user based on his or her profile. In the taxonomy-based directory 20, categories of low interest to the user have been eliminated. Specifically, "Arts & Humanities" 21, and "Business & Economy" 22 have been eliminated, among others. This reorganization reduces what may be perceived by a user as clutter and greatly simplifies the presentation. However, the full functionality of the original page may be preserved, for example, by adding links to "Other" categories 142, as shown under Departments, and in the taxonomy-based directory. Thus, the user may more quickly and easily locate material that is most likely to be of interest to him or her and still access other areas of the Web site, when desired.

Figure 3:
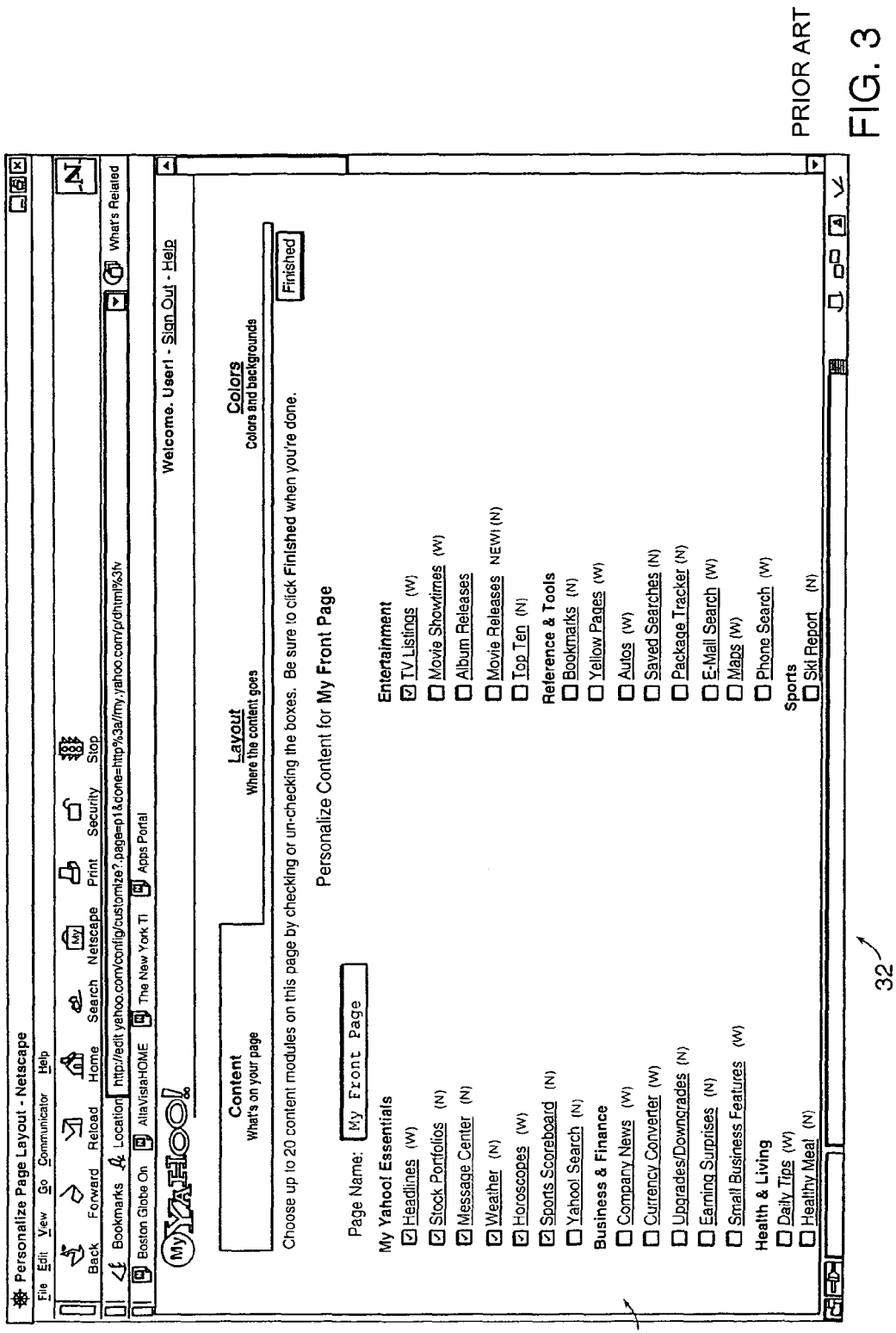
FIG. 3 is a screen-shot in a browser window of a Yahoo!® Web page that allows users to select specific types of content for a personalized "My Front Page."
Figure 4:
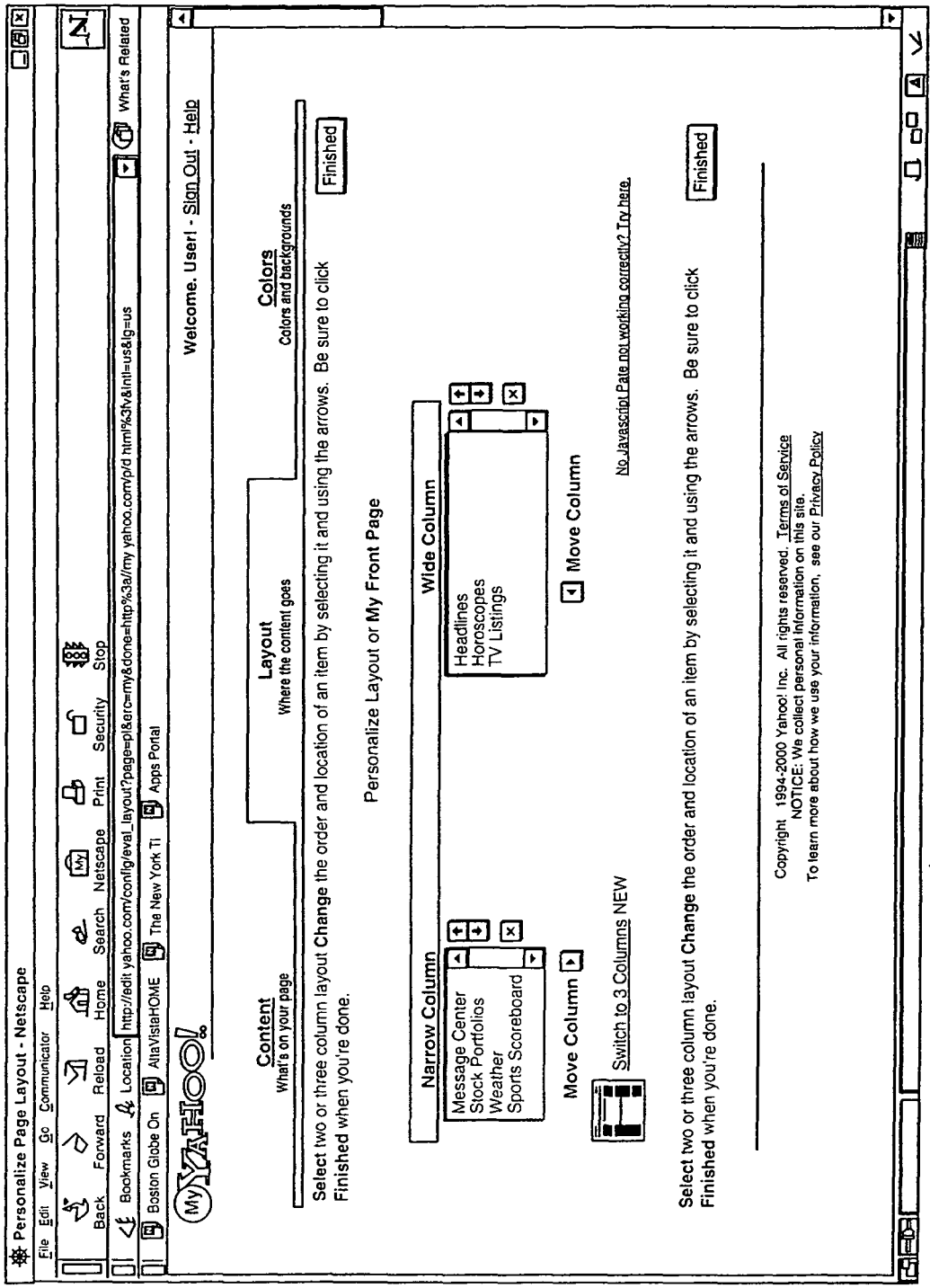
FIG. 4 is a screen-shot in a browser window of a Yahoo!® Web page that allows users to modify the layout of "My Front Page."
Figure 5:
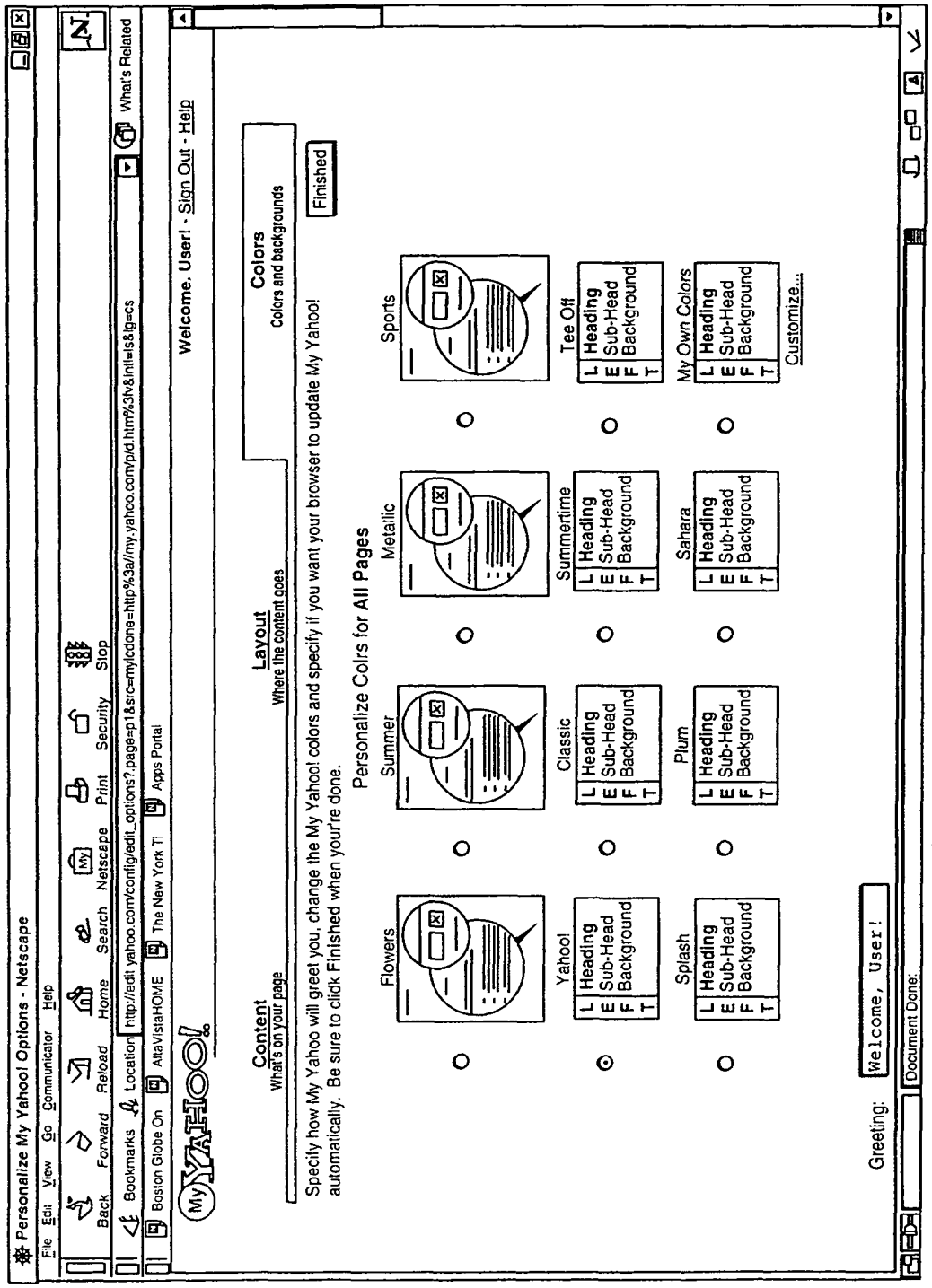
FIG. 5 is a screen-shot in a browser window of a Yahoo!® Web page that allows users to select a particular display scheme for Yahoo!® Web pages.

This rearrangement in accordance with the inventive system allows the user to more quickly and easily access the most pertinent subject areas for him or her. This rearrangement is transparent to the user, i.e., the user need not take specific steps to personalize or to invoke personalization of a particular Web page. Also, the user preferably receives the Web page without any perceptible delay as compared with regular delivery of a requested Web page. Moreover, if the content of a taxonomy-based directory changes, the user's preferred subject areas will continue to appear at the top of the taxonomy-based directory so long as his or her interests remain the same. Also, if the user's interests change, because the user profile is preferably tied to his or her Web surfing activity, those changes will automatically be recorded and taken into account without explicit action (e.g., changing selections on a checklist such as shown in FIG. 3) by the user.

The inventive system may also be combined with explicit preference selection by a user to enhance the automatic profiling. The present invention may be combined with selective delivery of advertising and other material as described in the '755 application. Although the inventive system has been described primarily with reference to an Internet-based network environment, the inventive system could also be implemented in a local-area network environment, for example. Also, while particular data structures, information storage and software distribution schemes have been described, any suitable scheme may be used. While the present invention has been illustrated and described with reference to preferred embodiments thereof, it will be apparent to those skilled in the art that modifications can be made and the invention can be practiced in other environments without departing from the spirit and scope of the invention, set forth in the accompanying claims.

We claim:

1. A method for web page personalization, comprising:
   profiling a web page to create a web page profile by parsing the web page to extract different types of content components and associating a classification selected from a plurality of classifications with each one of different types of the content components, wherein the plurality of classifications comprises psychographic categories, the web page profile being distinct from and stored separately from the web page;
   providing a user profile having a plurality of psychographic categories, each psychographic category having an affinity rating and a confidence value, the affinity rating and the confidence value of the psychographic categories of the user profile being derived from the user's actual web surfing activity associated with a plurality of web sites;
   comparing the psychographic categories of the web page profile to the psychographic categories of the user profile to identify matching psychographic categories;
   checking whether the web page is subject to personalization by determining whether the web page profile specifies preferences or instructions regarding the handling of the personalization;
   if the web page is not subject to personalization, producing an unmodified web page; and
   if the web page is subject to personalization, producing a modified web page by:
      eliminating at least one content component of the web page based on the affinity rating for the matching psychographic categories, and
      rearranging the content components of the web page in an order based on the affinity rating and the confidence value from the user profile for the matching psychographic categories.

2. The method of claim 1, wherein said user profile includes a plurality of demographic data.

3. The method of claim 2, wherein producing the modified web page includes making more prominent a portion of each content component having classifications generally matching demographic data in the user profile.

4. The method of claim 2, wherein producing the modified web page includes making less prominent a portion of each content component having classifications not generally matching demographic data in the user profile.

5. The method of claim 1, wherein the psychographic categories includes affinity ratings for content components, the affinity ratings including a subset of higher affinity ratings, and further wherein producing the modified web page includes making more prominent a portion of each content component having classifications generally matching psychographic data in the subset of higher affinity ratings.

6. The method of claim 5, wherein the psychographic categories includes the affinity ratings for content components, the affinity ratings including a subset of lower affinity ratings, and further wherein producing the modified web page includes making less prominent a portion of each content component having classifications generally matching psychographic data in the subset of lower affinity ratings.

7. The method of claim 1, wherein said user profile includes a plurality of geographic data.

8. The method of claim 7, wherein producing the modified web page includes providing those content components that match geographic data.

9. The method of claim 1, wherein at least one of the content components is news or weather information.

10. The method of claim 1, wherein the rearranged content components includes at least one of links, advertisements, images and text.

11. The method of claim 1, wherein producing the modified web page further includes providing a link to the eliminated at least one content component.

12. A method for web page personalization, comprising:
    providing a plurality of web page profiles of a plurality of web pages, the plurality of web page profiles being created by parsing the plurality of web pages to extract different types of content components and associating a classification selected from a plurality of classifications with each one of the different types of content components, the plurality of classifications comprises psychographic categories and wherein the plurality of web page profiles being distinct from and stored separately from the plurality of web pages;
    providing a plurality of user profiles having a plurality of psychographic categories, each psychographic category having an affinity rating and a confidence value;
    detecting a request from a user for a selected web page;
    obtaining a particular web page profile for the selected web page;
    selecting a user profile for the user, wherein the selected user profile is derived from the user's actual web surfing activity associated with a plurality of web sites;
    comparing the psychographic categories of the particular web page profile to the psychographic categories of the selected user profile to identify matching psychographic categories;
    checking whether the web page is subject to personalization by determining whether the particular web page profile specifies preferences or instructions regarding the handling of the personalization;
    if the web page is not subject to personalization, producing an unmodified web page; and
    if the web page is subject to personalization, producing a modified web page based on the particular web page profile and the selected user profile by eliminating a portion of the content components of the selected web page based on the affinity rating from the selected user profile for the matching psychographic categories and rearranging the content components of the selected web page in an order based on the affinity rating and the confidence value from the selected user profile for the matching psychographic categories and sending the modified web page for delivery to a particular user.

13. The method of claim 12, wherein the plurality of web page profiles are dynamically generated when the request from the user for the selected web page is detected.

14. The method of claim 13, wherein the plurality of web page profiles are generated and cached before the request from the user is detected.

15. A system for web page personalization, comprising:
    a processing unit; and
    a memory including processing instructions, which when executed by the processing unit are operative to:

profile a web page to create a web page profile by parsing the web page to extract different types of content components and associating a classification selected from a plurality of classifications with each one of the different types of content components, wherein the plurality of classifications comprises psychographic categories, the web page profile being distinct from and stored separately from the web page;

provide a user profile having a plurality of psychographic categories, each psychographic category having an affinity rating and a confidence value, the affinity rating and the confidence value of the psychographic categories of the user profile being derived from the user's actual web surfing activity associated with a plurality of web sites;

compare the psychographic categories of the web page profile to the psychographic categories of the user profile to identify matching psychographic categories;

check whether the web page is subject to personalization by determining whether the web page profile specifies preferences or instructions regarding the handling of the personalization;

if the web page is not subject to personalization, producing an unmodified web page; and if the web page is subject to personalization, produce a modified web page by:

eliminating a portion of the content components of the web page based on the affinity rating of the psychographic categories from the user profile from the matching psychographic categories, and rearranging the content components of the web page in an order based on the affinity rating and the confidence value from the selected user profile for the matching psychographic categories.

16. The system of claim 15, wherein the user profile includes a plurality of demographic data.

17. The system of claim 15, wherein producing the modified web page includes providing the content components that match geographic data.

18. The system of claim 15, wherein the rearranged content components includes at least one of links, advertisements, images, and text.

19. The system of claim 15, wherein producing the modified web page further includes providing a link to the eliminated portion.

* * * * *

UNITED STATES PATENT AND TRADEMARK OFFICE
CERTIFICATE OF CORRECTION

PATENT NO. : 8,527,869 B2  Page 1 of 1
APPLICATION NO. : 11/057759
DATED : September 3, 2013
INVENTOR(S) : Hosea et al.

It is certified that error appears in the above-identified patent and that said Letters Patent is hereby corrected as shown below:

In the Claims

Col. 12, line 25, claim 12: "wherein and the plurality" should read --wherein the plurality--

Col. 12, line 41, claim 12: "the web page is subject" should read --the selected web page is subject--

Col. 12, line 45, claim 12: "the web page is not subject" should read --the selected web page is not subject--

Col. 12, line 47, claim 12: "the web page is subject" should read --the selected web page is subject--

Signed and Sealed this
Thirtieth Day of December, 2014

Michelle K. Lee
*Deputy Director of the United States Patent and Trademark Office*